United States Patent
Halbach et al.

(10) Patent No.: US 12,036,561 B2
(45) Date of Patent: Jul. 16, 2024

(54) METHOD OF PRODUCING A GYPSUM SLURRY FOR FORMING GYPSUM PRODUCTS AND METHOD OF MANUFACTURING A GYPSUM PRODUCT

(71) Applicant: Knauf Gips KG, Iphofen (DE)

(72) Inventors: Martin Halbach, Niederwerrn (DE); Tong Liu, Tianjin (CN)

(73) Assignee: Knauf Gips KG, Iphofen (DE)

( * ) Notice: Subject to any disclaimer, the term of this patent is extended or adjusted under 35 U.S.C. 154(b) by 1259 days.

(21) Appl. No.: 16/619,219

(22) PCT Filed: Jun. 29, 2017

(86) PCT No.: PCT/EP2017/000772
§ 371 (c)(1),
(2) Date: Dec. 4, 2019

(87) PCT Pub. No.: WO2019/001677
PCT Pub. Date: Jan. 3, 2019

(65) Prior Publication Data
US 2020/0179939 A1    Jun. 11, 2020

(51) Int. Cl.
*C04B 14/36* (2006.01)
*B02C 19/00* (2006.01)
*C04B 18/167* (2023.01)
*C04B 20/02* (2006.01)
*C04B 28/14* (2006.01)
*C04B 111/00* (2006.01)

(52) U.S. Cl.
CPC ........ *B02C 19/0056* (2013.01); *C04B 14/365* (2013.01); *C04B 18/167* (2013.01); *C04B 20/026* (2013.01); *C04B 28/14* (2013.01); *C04B 2111/0062* (2013.01)

(58) Field of Classification Search
CPC .......................... B02C 19/0056; C04B 20/026
See application file for complete search history.

(56) References Cited

U.S. PATENT DOCUMENTS

| | | | |
|---|---|---|---|
| 4,098,465 | A | 7/1978 | Meller et al. |
| 7,861,955 | B2 | 1/2011 | Tracy et al. |
| 2002/0112651 | A1 | 8/2002 | Yu et al. |
| 2004/0026002 | A1 | 2/2004 | Weldon et al. |
| 2009/0159173 | A1 | 6/2009 | Skinner et al. |
| 2012/0034836 | A1 | 2/2012 | Rigaudon et al. |
| 2015/0376063 | A1 | 12/2015 | Francis |

(Continued)

FOREIGN PATENT DOCUMENTS

| | | | |
|---|---|---|---|
| AR | 053623 | A1 | 5/2007 |
| AR | 054389 | A1 | 6/2007 |
| AR | 074030 | A1 | 12/2010 |

(Continued)

*Primary Examiner* — Faye Francis
(74) *Attorney, Agent, or Firm* — The Webb Law Firm

(57) ABSTRACT

A method of producing a gypsum slurry for forming gypsum products, in particular gypsum boards, preferably gypsum paper boards, the method including the steps of: a) providing a gypsum paper product comprising a gypsum and a paper component, in particular a gypsum paper board, and/or broken parts thereof; b) wet grinding the gypsum paper product and/or the broken parts thereof containing at least parts of the paper component to form a wet ground gypsum paper component.

12 Claims, 1 Drawing Sheet

(56) References Cited

U.S. PATENT DOCUMENTS

2016/0214895 A1    7/2016   Van Strien et al.

FOREIGN PATENT DOCUMENTS

| | | | |
|---|---|---|---|
| AT | 005968 U1 | 2/2003 | |
| EP | 1421995 | * 10/2003 | ......... B02C 19/0056 |
| EP | 2030693 B1 | 10/2011 | |
| EP | 2641886 A2 | 9/2013 | |
| EP | 3187474 A1 | 7/2017 | |
| JP | 04063241 A | 2/1992 | |
| JP | H769700 A | 3/1995 | |
| JP | 2000016857 A | 1/2000 | |
| JP | 2002097058 A | 4/2002 | |
| JP | 2002293605 A | 10/2002 | |
| JP | 2004136206 A | 5/2004 | |
| JP | 200682487 A | 3/2006 | |
| JP | 2006273599 A | 10/2006 | |
| JP | 2012241247 A | 12/2012 | |
| JP | 2016164286 A | 9/2016 | |
| RU | 2263644 C2 | 9/2003 | |
| RU | 2427550 C2 | 5/2010 | |
| SU | 1576506 A1 | 7/1990 | |
| WO | 98009925 A1 | 3/1998 | |
| WO | 0212141 A1 | 2/2002 | |
| WO | 2009064602 A1 | 5/2009 | |
| WO | 2015200156 A1 | 12/2015 | |

* cited by examiner

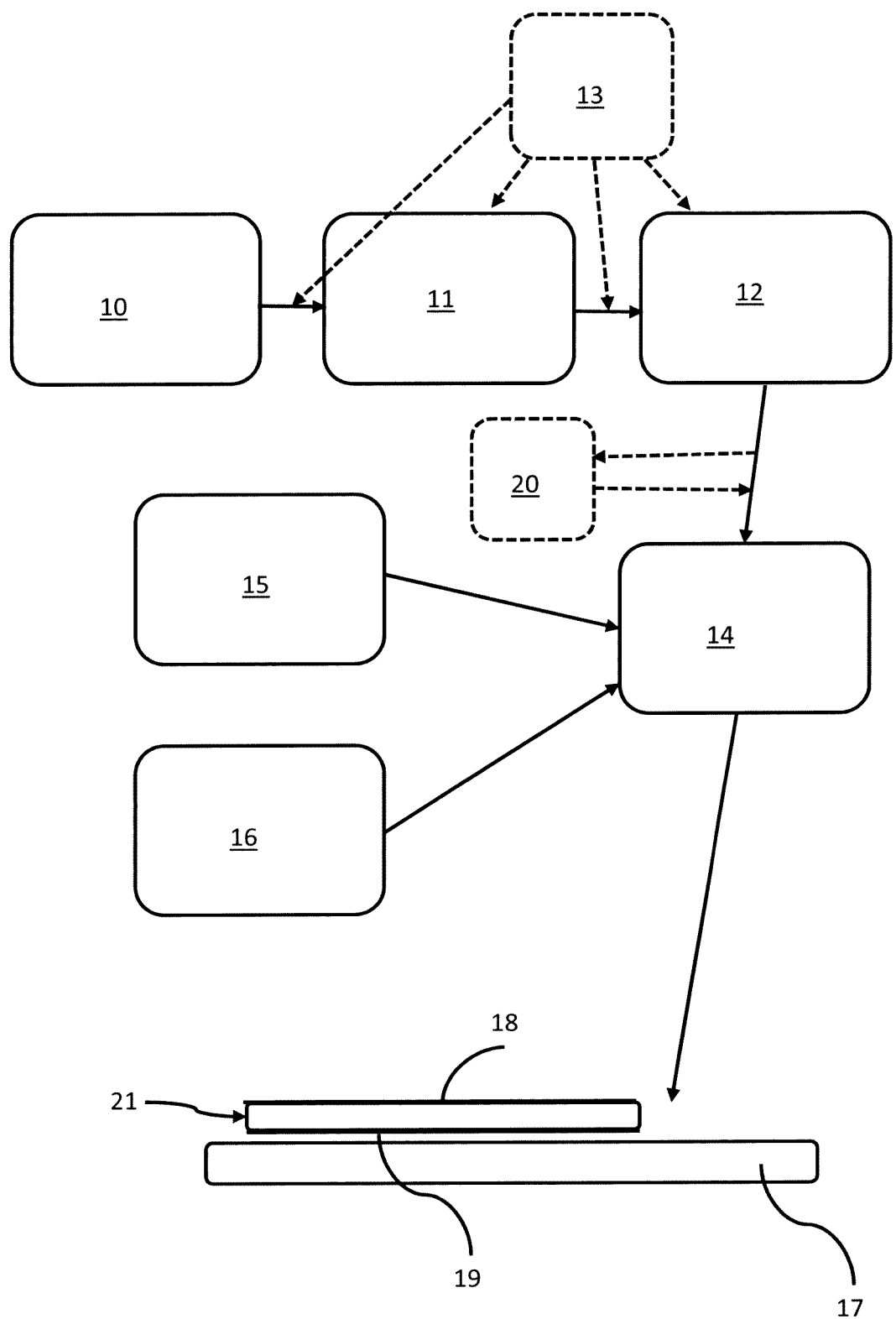

METHOD OF PRODUCING A GYPSUM SLURRY FOR FORMING GYPSUM PRODUCTS AND METHOD OF MANUFACTURING A GYPSUM PRODUCT

CROSS-REFERENCE TO RELATED APPLICATION

This application is the United States national phase of International Application No. PCT/EP2017/000772 filed Jun. 29, 2017, the disclosure of which is hereby incorporated by reference in its entirety.)

BACKGROUND OF THE INVENTION

Field of the Invention

The present invention relates to a method of producing a gypsum slurry for forming gypsum products, in particular gypsum boards, to a method of manufacturing a gypsum product, in particular gypsum board, to a gypsum slurry for forming gypsum products, in particular gypsum boards, to a gypsum product, in particular, gypsum board and to a system for manufacturing a gypsum product, in particular gypsum board.

DESCRIPTION OF RELATED ART

Methods for producing gypsum products, in particular gypsum boards are well-known. Furthermore, it is known to at least partially recycle manufactured gypsum paper products, such as gypsum paper boards, by forming new gypsum products. For example, EP 2 641 886 A2 describes a gypsum powder containing hemihydrate gypsum powders and type II anhydrous gypsum powders. The type II anhydrous gypsum is obtained by calcining dihydrate gypsum recovered from gypsum board waste. EP 2 641 886 A2 describes further that a part of the type II anhydrous gypsum may be replaced by dihydrate. Also, this dihydrate may be obtained from recycling material. Powders of gypsum board waste are obtained by pulverising board waste and letting the pulverised product passing through a sieve to remove the board papers. EP 2 030 693 B1 and US 2016/0124895 A1 also describe recycling of gypsum products in which devices (such as sieves) are provided in order to separate the paper waste from the rest of the gypsum product waste. WO 2009/064602 A1 describes wet grinding a dihydrate together with a specific dispersant. The ground gypsum is to be used for cosmetics, paper or coatings as a filler. However, WO 2009/064602 A1 is not related to recycling of gypsum product waste.

The known methods of use of recycling gypsum products such as gypsum paper boards are rather complex, in particular due to the removal of paper components. However, the step of removing the paper cannot simply be omitted because the paper fibres cause problems in the calcining process (calcining aggregates) performed in the prior art. Moreover, the paper fibres may reduce a heat transfer in the calciner (if the paper sticks to the walls).

It is now an object of the present invention to propose a method of producing a gypsum slurry for forming gypsum products, in particular gypsum boards, preferably gypsum paper boards or gypsum fibre boards, a method of manufacturing a gypsum product, in particular a gypsum board, preferably a gypsum paper board or gypsum fibre board, a gypsum slurry for forming gypsum products, in particular gypsum boards, preferably gypsum paper boards or gypsum fibre boards and a gypsum product, in particular a gypsum board, preferably gypsum paper board or gypsum fibre board, and a system for manufacturing a gypsum product, in particular gypsum board, preferably gypsum paper board or gypsum fibre board, wherein an efficient and simple recycling of gypsum paper products (i.e. products having a gypsum and a paper component) or parts thereof (including parts of the gypsum component and parts of the paper component) can be achieved.

SUMMARY OF THE INVENTION

According to the invention, a method of producing a gypsum slurry for forming gypsum products, in particular gypsum boards, preferably gypsum paper boards or gypsum fibre boards, is proposed, comprising the steps of:
a) providing a gypsum paper product comprising a gypsum and a paper component, in particular a gypsum paper board, and/or broken parts thereof (comprising parts of the gypsum and the paper component);
b) wet grinding (milling) the paper products and/or the broken parts thereof containing at least parts of the paper component to form a wet ground gypsum paper component.

A core idea of the invention is to disintegrate (grind) the gypsum paper product together with the paper component (i.e. without a previous removal of the paper component). In this regard, it has been recognised that the problems of a calcination of disintegrated gypsum board waste including paper fibres can be avoided by (directly) feeding the (non-calcined) ground material into a gypsum slurry for forming (new) gypsum products. Surprisingly, correspondingly manufactured new gypsum products (gypsum paper boards) showed reliable and satisfying material characteristics. In essence, an efficient and simple recycling of gypsum paper products (or leftovers thereof) can be achieved.

A gypsum product is in particular a product with a gypsum component (which may form at least 50 wt % or at least 80 wt % of the gypsum product). A gypsum board is a gypsum product having a board shape (i.e. being in particular, at least substantially, flat). The gypsum board may have a rectangular shape and a thickness of between 1 mm and 5 cm. A gypsum paper board is a gypsum board with a paper component, in particular as a surface layer. In embodiments, one or both sides of the gypsum paper boards may be formed by a paper layer. A gypsum paper product is a product comprising a gypsum and a paper component. The paper component forms preferably at least parts of an outer surface of the gypsum paper product, for example at least 2% or at least 5% or at least 8% of the outer surface thereof. The paper component may define less than 20 wt %, preferably less than 10 wt %, further preferably less than 2 wt % of the gypsum paper product in relation to the gypsum component. Further, the paper component may define more than 0.1 wt %, preferably more than 1 wt %, further preferably more than 3 wt % of the gypsum paper product in relation to the gypsum component. Broken parts of the gypsum paper product, in particular gypsum paper board are in particular any parts comprising at least parts of the gypsum and the paper component of the gypsum paper product. The broken parts can be leftovers, waste or unused/non-usable gypsum paper products, in particular gypsum paper boards. The amount of the paper component in relation to the gypsum component in the broken parts can be (in weight percent) as explained with respect to the gypsum paper product, in particular gypsum paper board. The broken parts may be parts which are incidentally and/or purposively broken, e.g.

by shredding gypsum paper products, in particular gypsum paper boards or (larger) broken parts thereof. The wet grinding may comprise utilisation of one or more mills. An (average) sieve particle size of the wet ground gypsum paper component is preferably below 3 mm, further preferably below 1 mm. A diameter of the broken parts (counting at least 50 wt % or at least 90 wt % of the broken parts being involved, in relation of the weight of all broken parts being involved) may be between 2 cm and 50 cm, in particular between 10 cm and 40 cm. The diameter may be a maximum diameter of the respective broken part (e.g. for a cuboid the space diagonal).

Wet grinding means in particular that the gypsum paper product and/or the broken parts thereof is ground in a wet state (for example, wherein the amount of water in the wet gypsum paper product and/or the broken parts thereof to be ground is at least 10 wt %, preferably at least 20 wt %) and/or adding water during (at least a certain time period of) the grinding process.

It is preferred to mix the wet ground gypsum paper component, with stucco (calcined gypsum).

The gypsum part of the wet ground paper component is preferably dihydrate (to at least 50 wt %, preferably at least 80 wt %, even further preferably at least 95 wt %).

In addition or alternatively to stucco, further components may be added to the gypsum slurry such as a retarder, a foaming agent, an accelerator and/or further gypsum types. Further, stucco and/or dihydrate can be added stemming from different sources.

The wet ground gypsum paper component is preferably a paper gypsum slurry containing water, paper (particles), in particular paper fibres, and gypsum (powder).

The paper gypsum slurry may have a solid component of at least 2 wt %, preferably at least 5 wt %, further preferably at least 15 wt % and/or not more than 50 wt %, preferably not more than 30 wt %, further preferably not more than 20 wt %. This allows for a reliable and efficient manufacturing of gypsum products, in particular gypsum (paper or fibre) boards. In particular, a reliable and efficient pumping of the material is possible.

The gypsum paper slurry may be fed into a container (in particular a silo). Preferably, the gypsum paper slurry is stored in the container (silo). In particular, the gypsum paper slurry is fed into the container (silo) before mixing the gypsum paper slurry with stucco. Collecting the gypsum paper slurry in a container (silo) allows to store a certain amount of gypsum paper slurry in order to feed it to a manufacturing process at an appropriate time. Stirring avoids sedimentation.

The solid content of the wet ground gypsum paper component, in particular gypsum paper slurry, with respect to the stucco may be at least 0.5 wt %, preferably at least 1 wt %, further preferably at least 2 wt % and/or not more than 10 wt %, preferably not more than 5 wt %, further preferably not more than 4 wt %. Thereby, the realiability of the process can be improved, in particular a reliable paper bonding can be achieved. The broken parts may be obtained by shredding the gypsum paper products. Further, (smaller) broken parts may be obtained by shredding (larger) broken parts of the gypsum paper product. This improves the efficiency of the method.

The wet ground gypsum paper product is preferably not calcined. The gypsum component of the ground gypsum paper product is preferably dihydrate.

According to a further aspect of the invention, a method of manufacturing a gypsum product, in particular gypsum board, preferably gypsum paper board or gypsum fibre board comprising the above method of producing a gypsum slurry and comprising removing water from the gypsum and forming (molding or otherwise configuring or arranging) the gypsum product, is proposed. If the gypsum product is a gypsum paper board, the method comprises preferably adding at one or both sides of the paper board an (outer) paper layer.

In the method of manufacturing a gypsum product, the wet ground gypsum paper product is preferably not calcined in particular to avoid problems with the paper components and calcination at this point or stage is not necessary for the later product quality, especially if the ground gypsum paper product is (basically) used as a filler.

According to another aspect of the invention, a use of a wet ground gypsum paper component as ingredient of a gypsum slurry for forming a gypsum product, in particular a gypsum board, preferably gypsum paper board or gypsum fibre board, is proposed.

According to a further aspect of the invention, a gypsum slurry for forming gypsum products, in particular gypsum boards produced by the above method is proposed.

According to another aspect of the invention, a gypsum product, in particular gypsum board, preferably gypsum paper board or gypsum fibre board, produced by the above method is proposed.

When shredding the gypsum paper product or broken parts thereof to be recycled, these may be done in a wet or dry state or partially in a wet state and partially in a dry state. In a shredder, the material may be shredded into parts of (about) 20×20 cm. The shredded parts may be delivered into a mill. There, the material may be milled (with addition of water).

A slurry including water, paper fibres and (fine) gypsum may be the output of such milling step. The solid content of the slurry may be between 15 to 20 wt %. Further, the slurry may be pumped into one or more containers (one or more silos). In these containers (silos), the slurry may be stirred to avoid sedimentation.

Out of the container (silo) the slurry may be pumped into a main mixer. In the mixer, the slurry may be mixed with stucco and optionally other raw materials for the production of gypsum boards. The solid content of the slurry in relation to the stucco fed into the mixer may be 2 wt % to 4 wt %. Thereby, paper bonding may be improved.

According to another aspect of the invention, a system for producing a gypsum slurry, in particular according to the above method, for forming gypsum products, in particular gypsum boards, preferably gypsum paper boards, is proposed, comprising:

a mill for wet grinding a gypsum paper product comprising a gypsum and a paper component, in particular gypsum paper board, and/or broken parts thereof to a wet ground gypsum paper component; a first feeding device for feeding the wet ground gypsum paper component to a mixer; and a second feeding device for feeding further components, in particular stucco to the mixer for mixing the slurry for forming gypsum products.

The system for producing a gypsum slurry for forming gypsum products may comprise a shredder for breaking (waste) gypsum paper boards or broken parts thereof. Moreover, the system may comprise means for feeding water for the wet grinding in the mill (for example before the shredder or in the shredder or between the shredder and the mill or in the mill). Moreover, the system may comprise a container (in particular silo) for storing the output of mill.

According to another aspect of the invention, a system of manufacturing a gypsum product, in particular gypsum board, preferably gypsum paper board, is proposed, comprising the above system for producing the gypsum slurry and a forming device for forming the gypsum product, in particular gypsum board, preferably gypsum paper board.

The forming device may comprise a forming table and/or forming band where the (final) gypsum product, in particular gypsum board, preferably gypsum paper board may settle and be formed.

BRIEF DESCRIPTION OF THE DRAWING

In the following, a preferred embodiment of the invention is described with reference to the following drawing:

FIG. 1: A schematic of a method of producing a gypsum paper board.

DESCRIPTION OF THE INVENTION

FIG. 1 shows a schematic of a method of producing a gypsum paper board. At reference sign 10, waste gypsum paper boards 10 are provided. The waste gypsum paper boards 10 are fed to a shredder 11, where the waste gypsum paper boards are shredded (e.g. into pieces of approximately 20×20 cm). From the shredder 11, the broken parts of the waste gypsum paper boards are fed to a mill 12 wet grinding the broken parts. Water 13 for the wet grinding can be provided before the shredder 11, within the shredder 11, between the shredder 11 and/or the mill 12 or in the mill 12 as indicated by broken arrows. From the mill 12, a paper gypsum slurry containing water, paper particles (fibres) and gypsum particles (powder) is fed to a (main) mixer 14. Furthermore, stucco 15 and (optionally) further additive 16 (such as other gypsum varieties, such as calcium sulphate at certain and/or different states of hydration, and/or retarders and/or foaming agents and/or accelerators) are fed to the mixer 14. In the mixer 14 a gypsum slurry is mixed and fed onto a forming device 17 (such as forming table or forming band). There, paper layers 18 and 19 are added to the slurry. The slurry together with paper layers 18 and 19 settles on the forming device 17. Next, the settled layer can be cut into boards 21 of an appropriate shape by a corresponding cutting device (such as a saw) so that a (new) gypsum paper board 21 is produced.

A silo 20 may be (optionally) provided between the mill 12 and the mixer 14 for storing the slurry coming from the mill 12 and for feeding the stored slurry to the mixer 14.

REFERENCE SIGNS 10 waste gypsum paper board
11 shredder
12 mill
13 water
14 mixer
15 stucco
16 other material
17 forming device
18 paper layer
19 paper layer
20 silo
21 (new) gypsum paper board

The invention claimed is:

1. A method of producing a gypsum slurry for forming gypsum products, comprising the steps of:
   a) providing a gypsum paper product comprising a gypsum component and a paper component and/or broken parts thereof;
   b) wet grinding the gypsum paper product and/or the broken parts thereof containing at least parts of the paper component to form a wet ground gypsum slurry; and
   c) mixing the wet ground gypsum slurry with stucco, wherein the wet ground gypsum slurry has a solid content between 2 wt % and 20 wt %, and wherein a solid content of the gypsum slurry with respect to the stucco is between 0.5 wt % and 5 wt %.

2. The method of claim 1, wherein step b) comprises forming a gypsum slurry containing water, paper particles, and gypsum.

3. The method of claim 2, further comprising feeding the wet ground gypsum slurry into a container.

4. The method of claim 3, wherein the wet ground gypsum slurry is stirred in the container and then mixed with stucco.

5. The method of claim 3, further comprising stirring the wet ground gypsum slurry that is fed into the container.

6. The method of claim 2, wherein the paper particles are paper fibres, and the gypsum is gypsum powder.

7. The method of claim 1, wherein the broken parts of the gypsum paper product are obtained by shredding the gypsum paper product.

8. The method of claim 1, wherein the gypsum paper product is not calcined.

9. The method of claim 1, wherein the gypsum paper product is a gypsum paper board.

10. A method of manufacturing a gypsum product comprising: producing the gypsum slurry of claim 1; and removing water from the gypsum slurry to form the gypsum product.

11. The method of claim 10, wherein the gypsum paper product is not calcined.

12. The method of claim 10, wherein the gypsum paper product is a gypsum board.

* * * * *